(12) United States Patent
Gilson

(10) Patent No.: US 12,212,621 B2
(45) Date of Patent: *Jan. 28, 2025

(54) MANIPULATION OF CONTENT TRANSMISSIONS

(71) Applicant: Comcast Cable Communications, LLC, Philadelphia, PA (US)

(72) Inventor: Ross Gilson, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/424,349

(22) Filed: Jan. 26, 2024

(65) Prior Publication Data

US 2024/0422216 A1 Dec. 19, 2024

Related U.S. Application Data

(63) Continuation of application No. 14/513,755, filed on Oct. 14, 2014, now Pat. No. 11,943,289.

(51) Int. Cl.
*H04L 67/1095* (2022.01)
*H04L 65/611* (2022.01)
*H04L 65/612* (2022.01)
*H04L 65/75* (2022.01)
*H04L 65/80* (2022.01)

(52) U.S. Cl.
CPC ........ *H04L 67/1095* (2013.01); *H04L 65/611* (2022.05); *H04L 65/612* (2022.05); *H04L 65/762* (2022.05); *H04L 65/80* (2013.01)

(58) Field of Classification Search
CPC . H04L 67/1095; H04L 65/611; H04L 65/612; H04L 65/762; H04L 65/80
See application file for complete search history.

(56) References Cited

U.S. PATENT DOCUMENTS

| 6,704,576 | B1 | 3/2004 | Brachman et al. |
| 7,546,120 | B1 | 6/2009 | Ulvenes |
| 7,558,262 | B2 * | 7/2009 | Tonjes ................ H04L 12/1836 370/432 |
| 8,813,143 | B2 | 8/2014 | Hasek |

(Continued)

FOREIGN PATENT DOCUMENTS

| CN | 104918072 A | 9/2015 |
| WO | 2015004276 A2 | 1/2015 |

OTHER PUBLICATIONS

U.S. Appl. No. 14/513,755 (2016/0105505), filed Oct. 14, 2014 (Apr. 14, 2016), Ross Gilson (Comcast Cable Communications, LLC).

(Continued)

*Primary Examiner* — Javier O Guzman
(74) *Attorney, Agent, or Firm* — Ballard Spahr LLP

(57) ABSTRACT

Disclosed are methods and systems for providing content. An example method can comprise receiving, at a content provider, a request for a content transmission from a first device and determining a parameter related to the first content transmission and comparing the parameter to a threshold. An example method can comprise determining, by the content provider, a second content transmission based on the comparison to the threshold and providing the second content transmission to the first in response to the request.

22 Claims, 10 Drawing Sheets

(56) References Cited

U.S. PATENT DOCUMENTS

| | | | |
|---|---|---|---|
| 8,826,349 B2* | 9/2014 | Joe | H04N 21/6371 |
| | | | 725/93 |
| 9,237,461 B1 | 1/2016 | Zhou et al. | |
| 9,769,795 B2 | 9/2017 | McEvilly | |
| 10,461,884 B2 | 10/2019 | Zachman et al. | |
| 2001/0025377 A1 | 9/2001 | Hinderks | |
| 2002/0138852 A1 | 9/2002 | Reynolds et al. | |
| 2002/0198506 A1 | 12/2002 | Whalen et al. | |
| 2003/0115274 A1 | 6/2003 | Weber | |
| 2003/0115294 A1 | 6/2003 | Hoang | |
| 2003/0134653 A1 | 7/2003 | Sarkkinen et al. | |
| 2004/0015999 A1 | 1/2004 | Carlucci et al. | |
| 2005/0220064 A1 | 10/2005 | Hundscheidt et al. | |
| 2005/0220202 A1 | 10/2005 | Tzannes | |
| 2005/0232292 A1 | 10/2005 | Richards et al. | |
| 2005/0233760 A1 | 10/2005 | Voltolina et al. | |
| 2005/0265374 A1* | 12/2005 | Pelt | H04N 21/4384 |
| | | | 375/E7.025 |
| 2006/0074968 A1 | 4/2006 | Gyetko | |
| 2007/0250861 A1 | 10/2007 | Angiolillo et al. | |
| 2007/0266414 A1 | 11/2007 | Kahn et al. | |
| 2008/0064425 A1 | 3/2008 | Kim et al. | |
| 2008/0098446 A1 | 4/2008 | Seckin et al. | |
| 2008/0195664 A1 | 8/2008 | Maharajh et al. | |
| 2008/0306962 A1 | 12/2008 | Grannan et al. | |
| 2009/0049485 A1 | 2/2009 | Agrawal et al. | |
| 2009/0274224 A1 | 11/2009 | Harris | |
| 2009/0310668 A1 | 12/2009 | Sackstein et al. | |
| 2010/0118888 A1 | 5/2010 | Picco et al. | |
| 2010/0316050 A1 | 12/2010 | Baykal et al. | |
| 2011/0143651 A1 | 6/2011 | Marocchi et al. | |
| 2011/0188439 A1 | 8/2011 | Mao et al. | |
| 2011/0249631 A1 | 10/2011 | Li et al. | |
| 2012/0140645 A1 | 6/2012 | Bonta et al. | |
| 2012/0198506 A1 | 8/2012 | Joe et al. | |
| 2012/0288259 A1 | 11/2012 | Gilson | |
| 2012/0307149 A1 | 12/2012 | Meek et al. | |
| 2013/0024582 A1 | 1/2013 | Rodrigues | |
| 2013/0051300 A1 | 2/2013 | He et al. | |
| 2013/0136049 A1* | 5/2013 | Song | H04W 4/06 |
| | | | 370/312 |
| 2013/0142499 A1 | 6/2013 | Major et al. | |
| 2013/0279391 A1 | 10/2013 | Gupta et al. | |
| 2014/0050082 A1* | 2/2014 | Sun | H04L 65/765 |
| | | | 370/230 |
| 2014/0149557 A1 | 5/2014 | Lohmar et al. | |
| 2014/0194100 A1 | 7/2014 | Anchan | |
| 2014/0269269 A1 | 9/2014 | Kovvali et al. | |
| 2014/0279781 A1 | 9/2014 | Ling et al. | |
| 2014/0355603 A1 | 12/2014 | Li et al. | |
| 2014/0372624 A1 | 12/2014 | Wang et al. | |
| 2015/0012929 A1 | 1/2015 | Huber | |
| 2015/0036494 A1 | 2/2015 | Kotecha et al. | |
| 2015/0092791 A1 | 4/2015 | Cornett et al. | |
| 2015/0180924 A1 | 6/2015 | O'Callaghan | |
| 2015/0289003 A1* | 10/2015 | Huber | H04L 65/1083 |
| | | | 725/116 |
| 2016/0028646 A1 | 1/2016 | Fablet et al. | |
| 2016/0105506 A1 | 4/2016 | Gilson | |
| 2017/0111463 A1 | 4/2017 | Maze et al. | |
| 2017/0126256 A1 | 5/2017 | Salomons et al. | |
| 2017/0230442 A1 | 8/2017 | Denoual et al. | |
| 2017/0280178 A1 | 9/2017 | Sun | |
| 2018/0035147 A1 | 2/2018 | DeVreese et al. | |
| 2018/0227142 A1 | 8/2018 | Horsley | |
| 2018/0278990 A1 | 9/2018 | Rutland et al. | |
| 2019/0109669 A1 | 4/2019 | Zachman et al. | |

OTHER PUBLICATIONS

U.S. Appl. No. 14/513,776 (2016/0105506), filed Oct. 14, 2014 (Apr. 14, 2016), Ross Gilson (Comcast Cable Communications, LLC).

U.S. Appl. No. 18/410,654, filed Jan. 11, 2024, Ross Gilson (Comcast Cable Communications, LLC).

U.S. Appl. No. 15/726,156 (U.S. Pat. No. 10/461,884), filed Oct. 5, 2017, (Oct. 29, 2019, Cory Zachman (Comcast Cable Communications, LLC).

U.S. Appl. No. 16/566,519 (U.S. Pat. No. 11,303,382), filed Sep. 10, 2019 (Apr. 12, 2022), Cory Zachman (Comcast Cable Communications, LLC).

U.S. Appl. No. 17/692,746 (2022/0303043), filed Mar. 11, 2022 (Sep. 22, 2022), Cory Zachman (Comcast Cable Communications, LLC).

* cited by examiner

MANIPULATION OF CONTENT TRANSMISSIONS

CROSS REFERENCE TO RELATED APPLICATION

This application claims priority under 35 U.S.C. § 120 to, and is a continuation of, U.S. patent application Ser. No. 14/513,755, filed Oct. 14, 2014, the entire contents of which are hereby incorporated herein by reference in its entirety for all purposes.

BACKGROUND

To save bandwidth, content providers may provide content to a plurality of users through a single content transmission. The users generally access the content by requesting the content transmission. Content providers may be limited in making an adjustment, interruption, or other changes to the content transmission because such may interrupt a user's consumption of the content. There is a need for more sophisticated methods and systems for providing content that allow flexible modification of content transmission without interruption of user consumption.

SUMMARY

It is to be understood that both the following general description and the following detailed description are exemplary and explanatory only and are not restrictive, as claimed. Disclosed are methods and systems for providing content. The present methods and systems allow for efficient use of network resources by dynamically switching users between content transmissions, such as multicast content transmissions. Instead of waiting for a user to request a different content transmission (e.g., at a higher or lower bit rate, at any portion of the transmission such in during the transmission or interactive portions thereof), a service provider can switch users from one content transmission to another. For example, several content transmissions (e.g., each at a different bit rate but providing the same content item) can be provided. The service provider can determine based on a parameter, such as a number of uses accessing a content transmission, that it is desired to terminate transmission of a particular content transmission. The service provider can provide another content transmission in response to the user's request for the original content transmission, thereby switching a user from one content transmission to another. In another aspect, the present and methods can use predictive logic to store multicast content transmission for users who have not requested access to a content transmission but are likely to request access in the future.

In one aspect, an example method can comprise receiving, at a content provider, a request for a first multicast content transmission from a first device and determining a parameter related to the first content transmission (e.g., first multicast content transmission). The parameter can be compared to a threshold. A second content transmission (e.g., second multicast content transmission) can be determined, by the content provider, based on the comparison to the threshold. The second content transmission can be provided to the first device in response to the request.

In one aspect, an example method can comprise determining a parameter related to a first content transmission (e.g., first multicast content transmission) having a first bit rate. The parameter can be compared to a threshold. The first bit rate can be adjusted to a second bit rate based on the comparison of the parameter to the threshold. The first content transmission having the second bit rate can be provided.

In one aspect, an example method can comprise receiving a first content transmission (e.g., first multicast content transmission). An instruction related to the first content transmission can be received. A second content transmission (e.g., second multicast content transmission) can be requested based on the instruction. The second content transmission can be received.

In one aspect, an example method can comprise requesting a first content transmission (e.g., first multicast content transmission) and receiving a second content transmission (e.g., second multicast content transmission). The second content transmission can be received in response to the requesting of the first content transmission. The second content transmission can be received instead of the first content transmission based on a number of users accessing the first content transmission.

In one aspect, an example method can comprise receiving a first content transmission (e.g., first multicast content transmission) at a first bit rate. At least a portion of a content item can be recorded from the first content transmission. A request for the content item can be received. At least one differential content transmission can be requested. The at least one differential content transmission can be configured to be combined with the recording of the at least a portion of the content item to form a copy of the content item at a second bit rate.

In one aspect, an example method can comprise selecting a device from a plurality of devices accessing a first content transmission (e.g., first multicast content transmission). A second content transmission (e.g., second multicast content transmission) can be selected based on a characteristic associated with the selected device. The second content transmission can be provided to the selected device instead of the first content transmission.

In one aspect, at least one of a first content transmission (e.g., first multicast content transmission) and a second content transmission (e.g., a second multicast content transmission) can be provided to a plurality of devices. A number of the plurality of devices accessing the first multicast content transmission can be determined, and the number can be compared to a threshold. The transmission of the first multicast content transmission can be ended (e.g., terminated) based on the comparison of the number of devices to the threshold.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1:
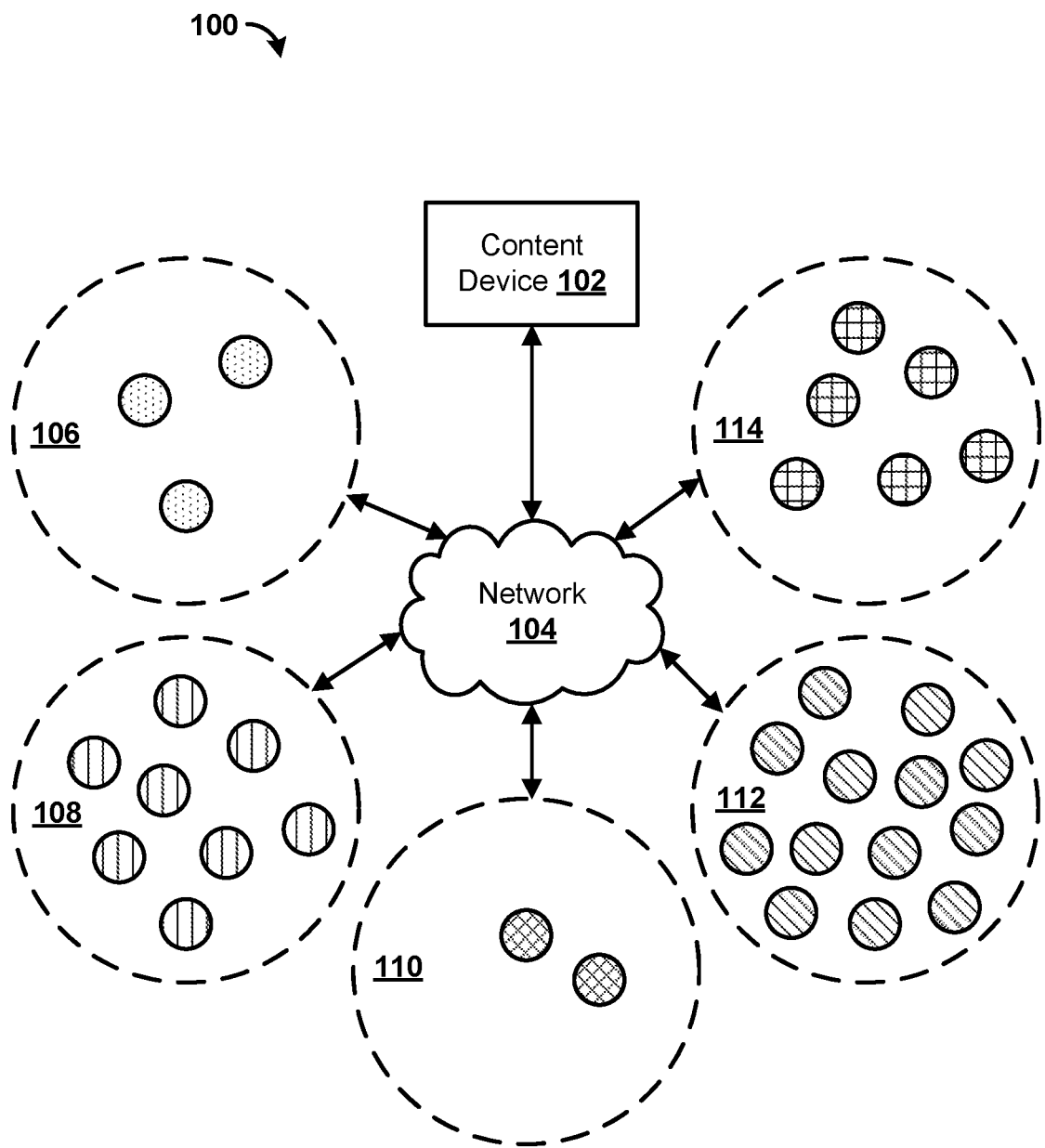
FIG. 1 is a block diagram illustrating an example system for providing content.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to providing content to a plurality of users. Specifically, the present disclosure describes methods and systems for conserving bandwidth or accomplishing other aims by altering content transmissions and/or redirecting users to alternate content transmissions. A content provider can provide, for example, several content transmissions for particular content. At least one (or each) of the content transmissions can be provided at a different bit rate than the other content transmissions. The content provider may desire to, at least temporarily, end or modify a particular content transmission. As another example, the content provider may desire to cause a user to access a different or modified content transmission than the content transmission requested by a user. As an illustration, the content transmission can comprise a multicast content stream. If the number of users accessing, requesting, and/or otherwise receiving the content transmission falls below a threshold, then the content provider can provide a content transmission that is different than the requested content transmission. For example, the content provider can provide a content transmission at different bit rate than the requested content transmission.

FIG. 1 is a block diagram illustrating an example system for providing content. Those skilled in the art will appreciate that present methods may be used in systems that employ both digital and analog equipment. One skilled in the art will appreciate that provided herein is a functional description and that the respective functions can be performed by software, hardware, or a combination of software and hardware. In an exemplary embodiment, the methods and systems disclosed can be located within one or more content device and/or user device. For example, the content device can be configured to provide, alter, end, and/or otherwise manage content transmissions and the users accessing, requesting, and/or receiving such content transmissions.

In one aspect, the system 100 can comprise a content device 102 configured to provide content to a variety of devices across a network 104. For example, the content device 102 can provide content as one or more content transmissions. A content transmission can comprise a content stream, file transfer, combination thereof, and/or the like. The one or more content transmissions can be multicast content transmissions, broadcast content transmissions, unicast content transmissions, and/or other types of transmissions. A multicast content transmission can comprise a content transmission that is provided to one or more users at the same time. A multicast transmission can comprise a content transmission to a group of addresses. As an example, the content device 102 can provide the same content with one or more multicast content transmissions at different bit rates. A broadcast content transmission can comprise a content transmission to all possible destinations.

In one aspect, the system 100 can comprise a first group 106 of user devices. The first group 106 of user devices can comprise a first number of user devices (e.g., illustrated as small circles within the group). Each of the user devices of the first group 106 of user devices can access (e.g., tune to) a first content transmission. The first transmission can be provided by the content device 102 at a first bit rate.

In one aspect, the system 100 can comprise a second group 108 of user devices. The second group 108 of user devices can comprise a second number of user devices. Each of the user devices of the second group 108 of user devices can access (e.g., tune to) a second content transmission. The second content transmission can be provided by the content device 102 at a second bit rate.

In one aspect, the system 100 can comprise a third group 110 of user devices. The third group 110 of user devices can comprise a third number of user devices. Each of the user devices of the third group 110 can access (e.g., tune to) a third content transmission. The third content transmission can be provided by the content device 102 at a third bit rate.

In one aspect, the system 100 can comprise a fourth group 112 of user devices. The fourth group 112 of user devices can comprise a fourth number of user devices. Each of the user devices of the fourth group 112 can access (e.g., tune to) a fourth content transmission. The fourth content transmission can be provided by the content device 102 at a fourth bit rate.

In one aspect, the system 100 can comprise a fifth group 114 of user devices. The fifth group 114 of user devices can comprise a fifth number of user devices. Each of the users devices of the fifth group 114 can access (e.g., tune to) a fifth content transmission. The fifth content transmission can be provided by the content device 102 at a fifth bit rate.

In one aspect, various users and/or devices can be associated with the same bit rate or different bit rates as other users and/or devices. A bit rates can be associated with a user and/or device based on the screen size, processing characteristics, memory characteristics, storage, and/or the like of the device. A bit rate can be associated with a user and/or device based on the device, user location, network connection (e.g., network bandwidth), and/or the like. For example, a mobile device (e.g., smart phone) can be configured for a different bit rate than a stationary device (e.g., computing station, television).

In one aspect, the user devices can be configured to switch from one group to another. For example, the user devices can be configured to switch from one content transmission to another content transmission. In one aspect, the content device 102 can be configured to receive requests for the content transmissions from the user devices. It should be noted that the number of user devices in any given group (e.g., first number, second number, third number, fourth number, and fifth number) can vary as user devices request the content transmissions and/or cease requesting and/or accessing the content transmissions.

In one aspect, the content device 102 can be configured to receive requests for the content transmissions. As explained in further detail herein, the present methods and systems can allow the content device 102 to provide a particular content transmission even though a different content transmission is requested. The content device 102 can be configured to switch a user device from one group of users to another by instructing a user device to switch to a content transmission other than the one the user device is currently accessing, requesting, and/or receiving. In another aspect, the content device 102 can be configured to switch a user device from one content transmission to another without notifying the user device. As another example, the content device 102 can be configured to alter the properties, parameters, and/or the like of a content transmission while a user device is accessing, requesting, and/or receiving a content transmission.

Figure 2:
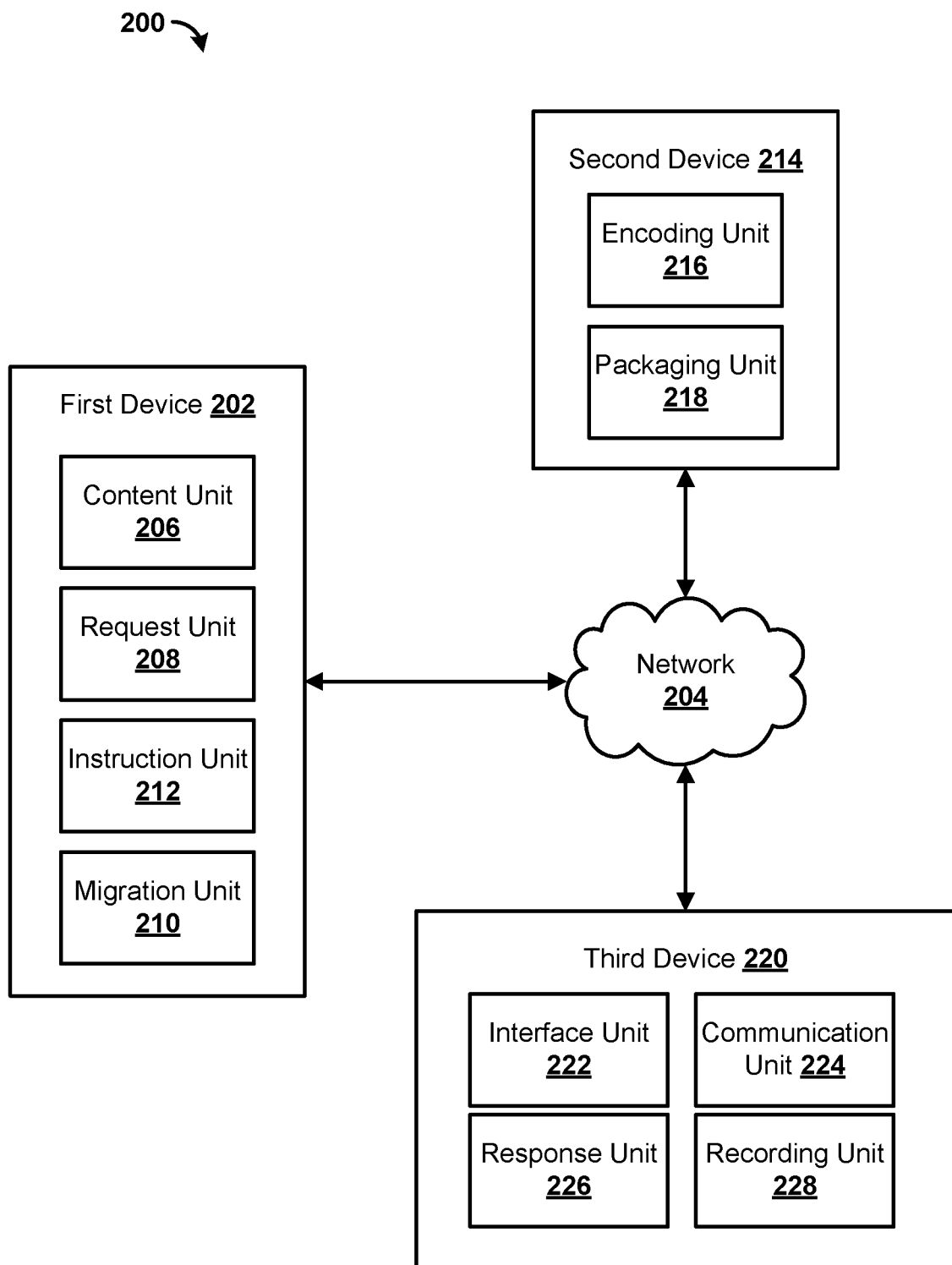
FIG. 2 is a block diagram illustrating another system for providing content.

FIG. 2 is a block diagram illustrating another system 200 for providing content. The system can comprise, be a part of, and/or implement all or a portion of the system 100 of FIG. 1. In one aspect, the system 200 can comprise a first device 202 configured to provide content, such as video, audio, images, text, and/or the like. As a further example, the content can comprise a live content channel, a content item (e.g., show, program, newscast, sportscast, episode, movie, song), and/or the like. The first device 202 can comprise the content device 102 of FIG. 1. The first device 202 can comprise a computing device, such as a server, termination system (e.g., cable modem termination system), and/or other similar device. For example, the first device 202 can provide the content across a network 204 to one or more devices (e.g., the third device 220).

In one aspect, the network 204 can comprise a packet switched network (e.g., internet protocol based network), a non-packet switched network (e.g., quadrature amplitude modulation based network), and/or the like. The network 204 can comprise network adapters, switches, routers, modems, and the like connected through wireless links (e.g., radio frequency, satellite) and/or physical links (e.g., fiber optic cable, coaxial cable, Ethernet cable, or a combination thereof). In one aspect, the network 204 can be configured to provide communication from telephone, cellular, modem, and/or other electronic devices to and throughout the system 200. The network 204 can be configured to transmit data (e.g., content) by unicast, multicast, broadcast, and/or the like. For example, a unicast transmission can comprise a transmission to one unique address. A multicast transmission can comprise a transmission to a group of addresses. A broadcast transmission can comprise a transmission to all possible destinations.

In one aspect, the first device 202 can comprise a content unit 206 configured to provide content. For example, the content unit 206 can be configured to provide content as one or more unicast streams, multicast streams, broadcast streams, file transfers, and/or the like. In one aspect, the content unit 206 can be configured to provide the content at one or more bit rates, from one or more locations (e.g., edge servers), according to one or more encoding schemes (e.g., audio codec, video codec), and/or the like. For example, particular content (e.g., content channel, content item) can be provided as one or more content transmissions (e.g., content stream, file transfer). At least one (or each) content transmission can be provided at a different bit rate than other content transmissions of the particular content. An example bit rate can comprise 20 megabits per second (mbps), 12 mbps, 7 mbps, 3 mbps, 1 mbps, 400 kilobits per second (kbps), and/or the like.

In one aspect, the content unit 206 can be configured to provide content transmissions as one or more differential content transmissions. A differential content transmission can comprise a content transmission that can be combined with one or more other content transmissions to form content at a specified bit rate. For example, a differential content transmission can be based on scalable video coding (SVC).

In one aspect, the content unit 206 can be configured to provide different content transmissions to different networks segments. For example, the content unit 206 can provide a first set of content transmissions to devices in a first multicast domain (e.g., defined by a grouping of network addresses). The content unit 206 can provide a second set of content transmissions to devices in a second multicast domain. For example, the first set of content transmissions can comprise at least one content transmission that is different and/or not included in the second set of content transmissions.

In one aspect, the first device 202 can comprise a request unit 208 configured to process requests. For example, a user (e.g., device) can request content from the first device 202. The request unit 208 can receive the request and identify content to fulfill the request. For example, the request can comprise a content identifier configured to identify a specific content location, a collection of content, and/or the like. The content identifier can comprise a universal resource identifier, such as a Hypertext Transfer Protocol link, and/or the like. The content identifier can be indicative of a program, show, episode, movie, interactive content, song, and/or the like. The content identifier can be indicative of a content transmission, such as a content stream, video on demand, file transfer, and/or the like.

In one aspect, the request unit 208 can be configured to provide alternate content based on a request for content. For example, a user (e.g., device) can request first content. The request unit 208 can be configured to provide second content in response to a request for the first content. The second content can be identified as the first content. For example, the second content can comprise one or more identifiers used for identifying the first content. As another example, the second content can be associated with a uniform resource locator that is identified as locating the first content. In one aspect, the request for the first content can be a request for a content transmission at a first bit rate. The second content can comprise a content transmission (e.g., comprising the same content channel, content source, and/or content item as the first content transmission) at a second bit rate.

In one aspect, the first device 202 can comprise a migration unit 210 configured to migrate one or more devices from one content transmission to another content transmission. For example, the migration unit 210 can select one or more devices for migration based on a parameter associated with a content transmission. For example, the parameter can comprise a number of devices that are at least one of accessing, requesting, and/or receiving a content transmission. The parameter can comprise a type of device, class of device, device history, user information (e.g., subscription tier, preferences, history), characteristic associated with a device that is at least one of accessing, requesting, and/or receiving a content transmission, and/or the like. The parameter can comprise information indicative of device buffer, connection speed, and/or the like. For example, it can be determined how long a device takes to download a data block, what data block the device is currently requesting, whether the device is ready and/or likely (e.g., probability) to switch to a higher or lower content transmission, amount of data in a device buffer, and/or the like. The migration unit 210 can analyze the parameter. For example, the migration unit 210 can compare the parameter to a threshold. If the parameter is above, below, and/or equals the threshold, then the migration unit 210 can migrate one or more devices from one content transmission to another. As an illustration, if the number of devices accessing content (e.g., movie, show, channel) from a 20 mbps content stream is below a threshold, then the devices can be migrated from the 20 mbps content stream to a content stream providing the content with a lower bit rate, such as a 12 mbps content stream.

In one aspect, migration of a device from one content transmission to another content transmission can comprise performing one or more actions resulting in a device requesting, accessing, and/or receiving a second content transmission instead of a first content transmission. For example, migration can comprise providing a second content transmission in response to a request for a first content transmission. The second content transmission can be identified as the first content transmission. For example, the second content transmission can comprise one or more identifiers used for identifying the first content transmission. As another example, the second content transmission can be associated with a uniform resource locator that is identified as locating the first content transmission. Migration can comprise altering, adjusting, and/or modifying a property of a first content transmission. For example, the property can comprise a bit rate, a source location (e.g., edge device), encoding scheme (e.g., audio codec, video codec), and/or the like. As an illustration, a first bit rate of the first content transmission can be changed to a second bit rate. Migration can comprise ending transmission of a first content transmission, thereby causing a device to request, access, and/or receive a second content transmission instead of the first content transmission. Migration can comprise instructing a device to access, request, and/or receive a second content transmission instead of the first content transmission. Migration can comprise instructing a device to stop accessing, requesting, and/or receiving a first content transmission (e.g., allowing the device to select another content transmission). The instruction can comprise a (e.g., current time, future time) to fulfill the instruction.

In one aspect, migration from the first content stream to the second content stream can be accomplished seamlessly (e.g., without substantial interruption to the view). For example, a user can continue to receive the first content stream while the second content stream is buffered by a user device.

In one aspect, the migration unit 210 can select one or more devices for migration based on one or more characteristics associated with the device. In another aspect, the migration unit 210 can select a content transmission for the device to migrate to based on one or more characteristics associated with the device. An example characteristic can comprise at least one of a screen size, a bandwidth, a screen resolution, class of device, device history, a location, a client account feature (e.g., class of user, subscription tier, user preference, user history), and/or the like. The characteristic can comprise a measurement of a buffer of the device accessing, requesting, and/or receiving a content transmission. For example, measurement of the buffer can be indicative of network congestion, bandwidth, and/or other characteristics of the device and/or network associated with a device. As a further example, if the buffer is above a threshold, then the migration unit 210 can select the device for migration to a first content transmission. If the buffer is below a threshold, then the migration unit 210 can select the device for migration to a second content transmission. The first content transmission can have a higher bit rate than the second content transmission.

In one aspect, the migration unit 210 can determine the size of a buffer of each (or at least one) of a plurality of devices requesting, accessing, and/or receiving a content transmission. The migration unit 210 can determine whether to end the content transmission based on the determination of the size of the buffers of the plurality of devices. The migration unit 210 can determine the number of the plurality of devices that are struggling to maintain the bandwidth to access the content transmission. If the number is above a first threshold, then the migration unit 210 can determine to initiate migration of one or of the plurality of devices to a first (e.g., lower bit rate) content transmission. If the number is below a second threshold, then the migration unit 210 can determine to continue providing the content transmission, migrate one or more of the plurality of devices to a second (e.g., higher bit rate) content transmission, and/or the like.

In one aspect, the first device 202 can comprise an instruction unit 212 configured to provide one or more instructions. For example, the instruction unit 212 can provide an instruction to a device that is at least one of accessing, requesting, and receiving a content transmission from the first device 202. The instruction can comprise an instruction that a first content transmission will cease transmission according to specified timing information. The instruction can comprise an instruction to access a second content transmission instead of the first content transmission. The instruction unit 212 can provide the instruction in response to analysis of a parameter associated with the first content transmission. For example, the instruction unit 212 can provide the instruction in response to the parameter being above, below, and/or equal to a threshold. As a further example, the instruction unit 212 can provide the instruction based on the parameter crossing a threshold value. As an illustration, the parameter can comprise a number of users accessing the first content transmission.

It should be noted that a threshold can comprise a predefined value, such as a number. The threshold can also vary based on one or more conditions, such as user input, network conditions, and/or the like. For example, a threshold can be higher or lower based on network congestion, server outages, and/or the like. In one aspect, one or more parameters can be compared to one or more thresholds. For example, a parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

In one aspect, the instruction unit 212 can be configured to receive a response to an instruction provided to a device, such as the third device 220. For example, a device can provide a response to the instruction. In one aspect, the response can be a negative response to the instruction. A negative response can comprise one or more reasons, error codes, and/or the like indicating an undesirable consequence to the device if the device complies with the instruction. As an illustration, the instruction can comprise an instruction to switch from a first content transmission to a second content transmission. The device can determine that switching to the second content transmission is undesirable. For example, the device can determine that the device has insufficient bandwidth, processing power, memory, and/or the like for accessing the second content transmission. As another example, the device can determine that switching to the second content transmission can violate a user preference, subscription plan, and/or the like. For example, a user can provide a user override to prevent accessing the second transmission. As an illustration, a user may desire to maintain accessing the first transmission if the user device is recording content for later playback. In another aspect, the response from the device can comprise a positive response. For example, the response can indicate that the device will comply with the instruction. The response can comprise timing information indicative of a time when the device will comply with the decision. The response can comprise content information indicative of a content transmission that the device will access in response to the instruction from the instruction unit 212.

In one aspect, an option can be provided for the user to override switching to the second content stream. For example, a user interface (e.g., provided by interface unit 222 of the third device 220) can provide an interface element, such as a dialog box, window, button, and/or the like to the user giving the user the option to override switching to the second content stream. The interface element can allow the user to cancel switching, switch back to the first content stream, switch to a different content stream, and/or the like.

In one aspect, the instruction unit 212 can be configured to analyze the response from the device. The instruction unit 212 can determine whether to end or continue transmission of the first content transmission based on the response. For example, if the response is a negative response the instruction unit 212 can be configured to continue transmission of the first content transmission. If the response is a positive response, the instruction unit 212 can be configured to end transmission of the first content transmission. In one aspect, the instruction unit 212 can be configured to determine (e.g., with downstream switches) if the device is accessing the second content transmission before ending transmission of the first content transmission. In another aspect, the instruction unit 212 can be configured to wait for, receive, and/or analyze additional instructions from the device, such as information indicating that the device is no longer accessing the first content transmission, is accessing the second content transmission (e.g., in addition to or instead of the first content transmission), and/or the like.

In one aspect, the system 200 can comprise a second device 214 configured to provide content. In one aspect, the second device 214 can be communicatively coupled to the first device 202 through the network 204. The second device 214 can comprise an encoding unit 216 configured to encode content. For example, the encoding unit 216 can be configured to compress, encrypt, and/or otherwise modify content. In one aspect, the second device 214 can comprise a packaging unit 218 configured to package content. For example, the packaging unit 218 can comprise a just in time packager configured to package content as a plurality of fragments (e.g., in response to a request). As an illustration, the second device 214 can receive a content transmission, such as a live content stream. The encoding unit 216 can encode the content transmission. The packaging unit 218 can package the encoded content transmission. The second device 214 can provide the encoded packaged content transmission to the first device 202 and/or other devices (e.g., the third device 220). The first device 202 can provide the encoded packaged content transmission to one or more other devices across the network. As another example, the first device 202 can direct other devices (e.g., the third device 220) to access, request, and/or receive content from the second device 214.

In an aspect, the system 200 can comprise a third device 220. The third device 220 can be communicatively coupled to the first device 202, second device 214, and/or other device through the network 204. In one aspect, the third device 220 can comprise an edge device. In another aspect, the third device 220 can comprise a user device. The third device 220 can be configured to provide content, services, information, applications, and/or the like to one or more users. For example, the third device 220 can comprise a computer, a smart device (e.g., smart phone, smart watch, smart glasses, smart apparel, smart accessory), a laptop, a tablet, a set top box, a display device (e.g., television, monitor), digital streaming device, proxy, gateway, transportation device (e.g., on board computer, navigation system, vehicle media center), sensor node, and/or the like.

In one aspect, the third device 220 can comprise an interface unit 222 configured to provide an interface to a user to interact with the third device 220 and/or remote devices, such as the first device 202. The interface unit 222 can comprise any interface for presenting and/or receiving information to/from the user, such as user feedback. An example interface can comprise a content viewer, such as a web browser (e.g., Internet Explorer®, Mozilla Firefox®, Google Chrome®, Safari®, or the like), media player, application (e.g., web application), mobile application, and/or the like. Other software, hardware, and/or interfaces can be used to provide communication between the user and one or more of the third device 220 and the first device 202.

In an aspect, the third device 220 can comprise a communication unit 224. As an example, the communication unit 224 can request or query various files and/or content transmission from a local source and/or a remote source. As a further example, the communication unit 224 can transmit and/or receive data to a local or remote device such as the first device 202. The communication unit 224 can comprise hardware and/or software to facilitate communication. For example, the communication unit 224 can comprise one or more of a modem, transceiver (e.g., wireless transceiver)), digital-to-analog converter, analog-to-digital converter, encoder, decoder, modulator, demodulator, tuner (e.g., QAM tuner, QPSK tuner), and/or the like. In one aspect, the communication unit 224 can be configured to allow one or more remote devices (e.g., in a local or remote portion of the network 204) to control operation of the third device 220.

In one aspect, the communication unit 224 can be configured to receive an instruction from another device, such as the first device 202, second device 214, and/or the like. The instruction can comprise an instruction from the instruction unit 212 of the first device 202. The instruction can comprise timing information, alternate content information, modification information, and/or the like. The timing information can comprise a time and/or date when a content transmission will be modified, will cease transmission, and/or the like. For example, the instruction can comprise an instruction that a first content transmission will cease transmission according to the timing information. The modification information can comprise information indicating one or more modifications that will be made to a content transmission at a future time. For example, the modification information can comprise a bit rate to which the content transmission will be adjusted, content that will be altered and/or supplied through the content transmission, and/or the like. The instruction can comprise an instruction that the transmission will be modified according to the modification information. The alternate content information can comprise an alternate content transmission to access (e.g., instead of the current content transmission). For example, the instruction can comprise an instruction to access an alternate content transmission within a time period specified by the timing information.

In one aspect, the third device 220 can comprise a response unit 226 configured to analyze the instruction received by the communication unit 224. The response unit can be configured to make a determination based on the instruction. For example, the response unit 226 can be configured to make the determination based on the timing information, alternate content information, modification information, and/or the like. In one aspect, the response unit 226 can be configured to determine a response to the instruction. For example, the response unit 226 can be configured to provide a negative response, positive response, no response, and/or the like based on the instruction. The negative response can comprise the negative response described herein. The positive response can comprise the positive response described herein.

In one aspect, the third device 220 can comprise a recording unit 228 configured to record content from a content transmission. The recording unit 228 can be configured to detect one or more content transmission received by the third device. The recording unit 228 can be configured to determine whether to record at least a portion of the content transmission. In one aspect, the recording unit 228 can determine to record at least a portion of the content transmission based on a prediction (e.g., probability) that a user will request access to the content transmission and/or a recording thereof. For example, the recording unit 228 can determine whether to record at least a portion of the content transmission based on viewing history, an indication or instruction from a user, social media information, user recommendations, content recording history, and/or the like. The prediction can be based on a user preference, social media information, geographic information (e.g., user location), demographics (e.g., gender, ethnicity, age), behavior of a group of users (e.g., social media contacts, address book contacts, users similar in geographic information and/or demographic information), and/or the like.

In one aspect, the recording unit 228 can be configured to combine the recording of at least a portion of the content transmission with another content transmission. For example, the recorded portion of the content transmission can be at a first bit rate. If a user requests the content transmission at a second bit rate that is higher than the first bit rate, then the recording unit 228 can combine the recorded portion of the content transmission with a content transmission comprising remaining portions of the content transmission sufficient to generate an instance of the content transmission at the bit rate requested by a user. As an illustration, the recording unit 228 can record a first differential content transmission (e.g., that is provided based on scalable video coding). If a user requests a content transmission at a second bit rate, the third device 220 can be configured to request a second differential content transmission. The recording unit 228 can be configure to combine the first differential content transmission, second differential content transmission, and/or the like to generate a content transmission at the requested second bit rate.

Figure 3:
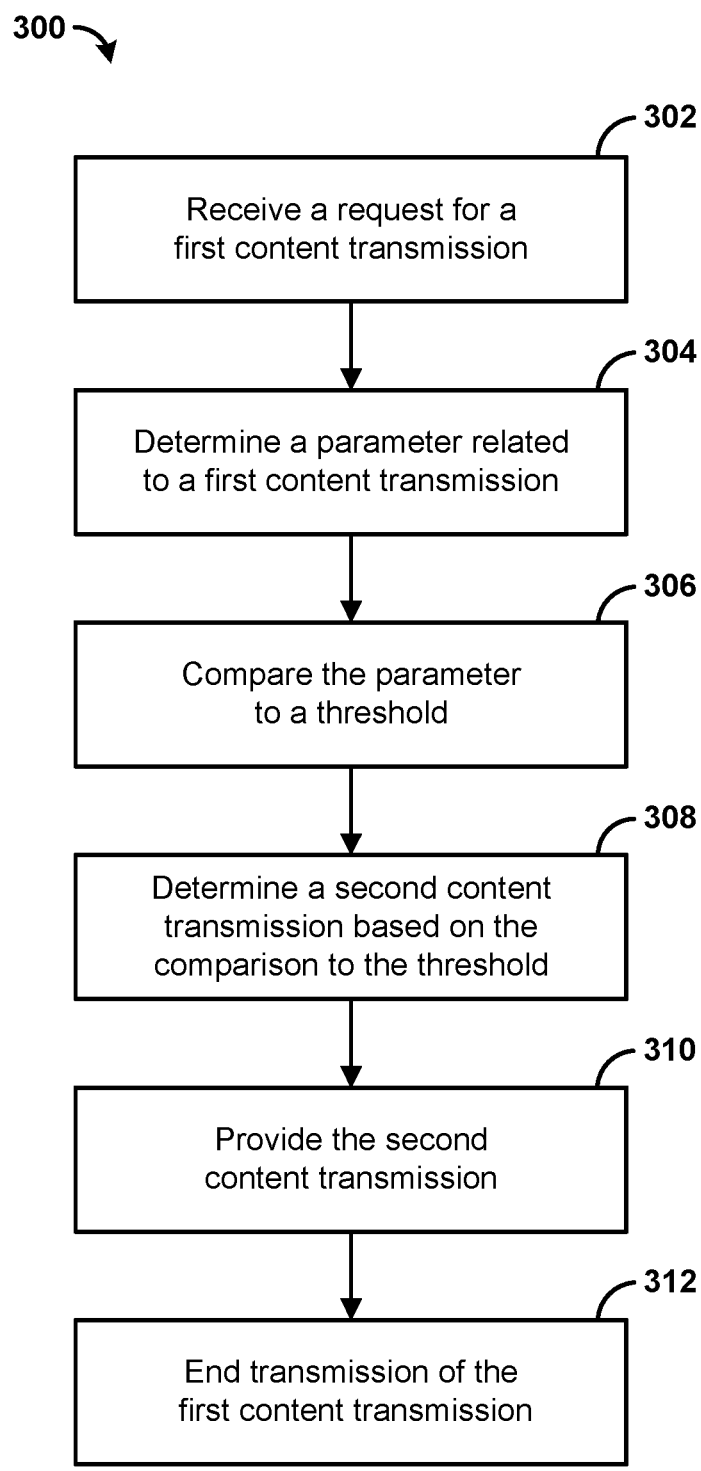
FIG. 3 is a flowchart illustrating an example method for providing content.

FIG. 3 is a flowchart illustrating an example method 300 for providing content. At step 302, a request for a first content transmission (e.g., first multicast content transmission) can be received. The request can be received by a provider (e.g., device managed by the provider), such as a content provider, service provider, and/or the like. For example, the request can be a request by a user and/or a first device, such as an edge device, user device, and/or the like. The first content transmission can comprise a content stream, file transfer, and/or the like.

At step 304, a parameter related to a first content transmission can be determined. The parameter can be determined by the provider (e.g., a device managed by the provider). The parameter can comprise a number of users at least one of accessing, requesting, and receiving the first content transmission. The parameter can be based on a measurement of a buffer of at least one device (e.g., first device, second device) accessing the first content transmission. For example, the measurement of the buffer of the at least one device can be indicative of at least one of a bandwidth, memory, processing capacity, and/or the like of the at least one device. The parameter can comprise and/or be indicative of a number of users accessing, requesting, and/or receiving the first content transmission within a specified group. For example, the group can be specified by device type, location, multicast downstream group, and/or the like. In one aspect, the parameter can comprise more than one value. In another aspect, the parameter can be used and/or determined with one or more additional parameters.

At step 306, the parameter can be compared to a threshold. For example, the threshold can comprise a predefined value, such as a number. The threshold can also vary based on one or more conditions, such as user input, network conditions, and/or the like. For example, a threshold can be higher or lower based on network congestion, server outages, and/or the like. It can be determined if the parameter is above, below, and/or equal to the predefined number. In one aspect, the parameter can be compared to additional thresholds. For example, the parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

At step 308, a second content transmission (e.g., second multicast content transmission) can be determined based on the comparison to the threshold. The second content transmission can be determined by the provider (e.g., device managed by the provider). The second content transmission can comprise a content stream, file transfer, and/or the like. For example, if the threshold is above, below, and/or equal to the parameter, then the second content transmission can be determined. In one aspect, the second content transmission can also be determined based on a characteristic associated with a device (e.g., first device) that is at least one of requesting, accessing, and receiving the first content transmission. The second content transmission can be selected for the device (e.g., based on the characteristic). The characteristic can comprise at least one of a screen size, a bandwidth, a screen resolution, class of device, device history, a location, a client account feature, and/or the like.

At step 310, the second content transmission can be provided. For example, the second content transmission can be provided (e.g., by the provider) to the device (e.g., first device). The second content transmission can be provided in response to the request (e.g., from the first device). In one aspect, the second content transmission can be identified as the first content transmission when the second content transmission is provided in response to the request. For example, the second content transmission can be identified by the same identifier (e.g., network identifier, content identifier, location identifier) as the first content transmission. In another aspect, the second content transmission can be provided instead of the first content transmission. The first content transmission can comprise content at a first bit rate. The second content transmission can comprise the content at a second bit rate. The first bit rate can be different than the second bit rate. For example, the first bit rate can be a bit rate that is lower or higher than the second bit rate. As an illustration, if the characteristic indicates that the device is associated with a bandwidth, memory, processing capacity, and/or the like such that the device is configured to receive a higher bit rate (e.g., or lower bit rate) than the first bit rate, then the second bit rate can comprise a bit rate higher (e.g., or lower bit rate) than the first bit rate.

At step 312, transmission of the first content transmission can be terminated (e.g., ceased, bring to an end). For example, a device providing (e.g., device managed provider) the first content transmission can discontinue providing the first content transmission across a network. As another example, the transmission can be discontinued for one or more multicast downstream groups. In some scenarios, one or more second downstream transmission groups can continue to receive the first content transmission.

Figure 4:
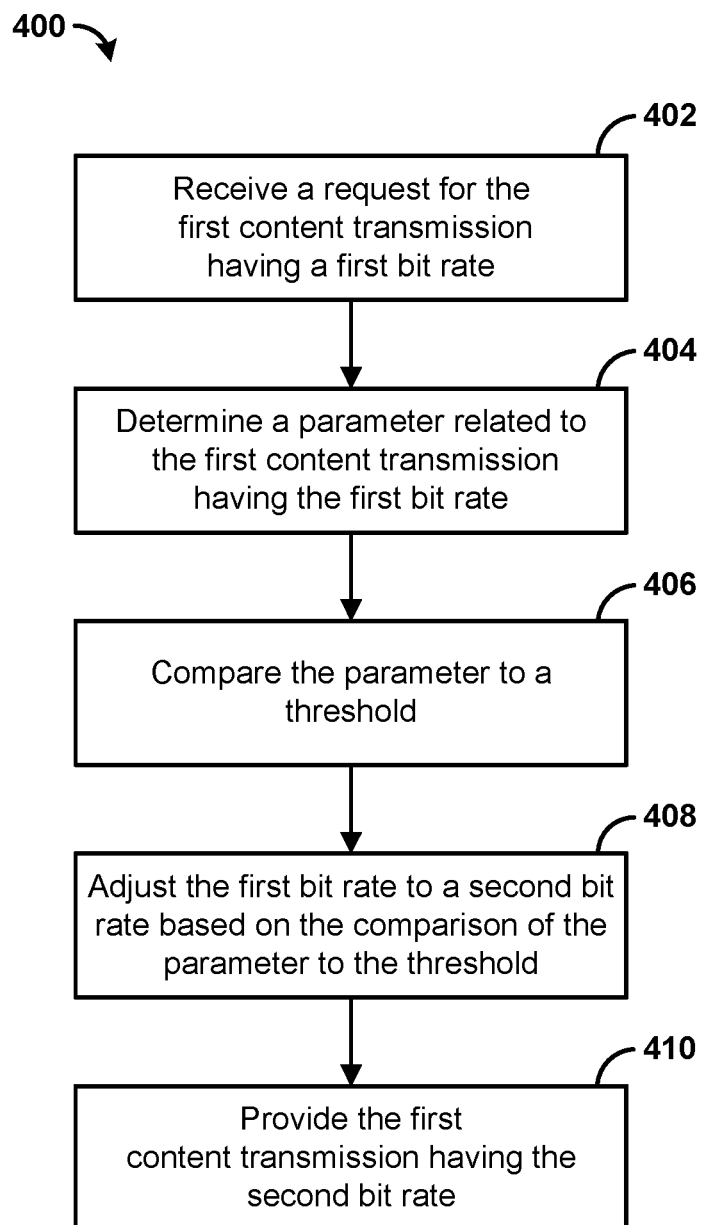
FIG. 4 is a flowchart illustrating another example method for providing content.

FIG. 4 is a flowchart illustrating another example method 400 for providing content. At step 402, a request for a first content transmission (e.g., first multicast content transmission) at having first bit rate can be received. For example, the request can be a request from a user and/or a device (e.g., first device), such as an edge device, user device, and/or the like. The first content transmission can comprise a content stream, file transfer, and/or the like.

At step 404, a parameter related to the first content transmission having the first bit rate can be determined. The parameter can comprise a number of devices accessing, requesting, and/or receiving the first content transmission. The parameter can be based on a measurement of a buffer of at least one device accessing the first content transmission.

For example, the measurement of the buffer of the at least one device can be indicative of at least one of a bandwidth, memory, processing capacity, and/or the like of the at least one device. In one aspect, the parameter can comprise more than one value. In another aspect, the parameter can be used with one or more additional parameters.

At step 406, the parameter can be compared to a threshold (e.g., or otherwise analyzed). For example, the threshold can comprise a predefined value, such as a number. The threshold can also vary based on one or more conditions, such as user input, network conditions, and/or the like. For example, a threshold can be higher or lower based on network congestion, server outages, and/or the like. It can be determined if the parameter is above, below, and/or equal to the predefined number. In one aspect, the parameter can be compared to additional thresholds. For example, the parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

At step 408, the first bit rate can be adjusted to a second bit rate based on the comparison of the parameter to the threshold (e.g., or based on other analysis of the parameter). The first bit rate can be adjusted to a second bit rate based on a characteristic associated with a device (e.g., first device) that is at least one of requesting, accessing, and receiving the first content transmission. The characteristic can comprise at least one of a screen size, a bandwidth, a screen resolution, class of device, device history, a location, and a client account feature. The first bit rate can be different than the second bit rate. For example, the first bit rate can be a bit rate that is lower or higher than the second bit rate. As an illustration, if the characteristic indicates that the device (e.g., first device) is associated with a bandwidth, memory, processing capacity, and/or the like such that the device is configured to receive a higher bit rate (e.g., or lower bit rate) than the first bit rate, then the second bit rate can comprise a bit rate higher (e.g., or lower bit rate) than the first bit rate. In another aspect, adjusting the first bit rate to a second bit rate can comprise merging the first content transmission with a second content transmission having the second bit rate.

At step 410, the first content transmission having the second bit rate can be provided. For example, the first content transmission having the second bit rate can be provided (e.g., to the device) in response to the request. The first content transmission having the second bit rate can be identified as the first content transmission having the first bit rate. For example, the first content transmission can be identified by the same identifier (e.g., network identifier, content identifier, location identifier) as the first content transmission having the second bit rate. The first content transmission having the second bit rate can be provided instead of the first content transmission having the first bit rate.

Figure 5:
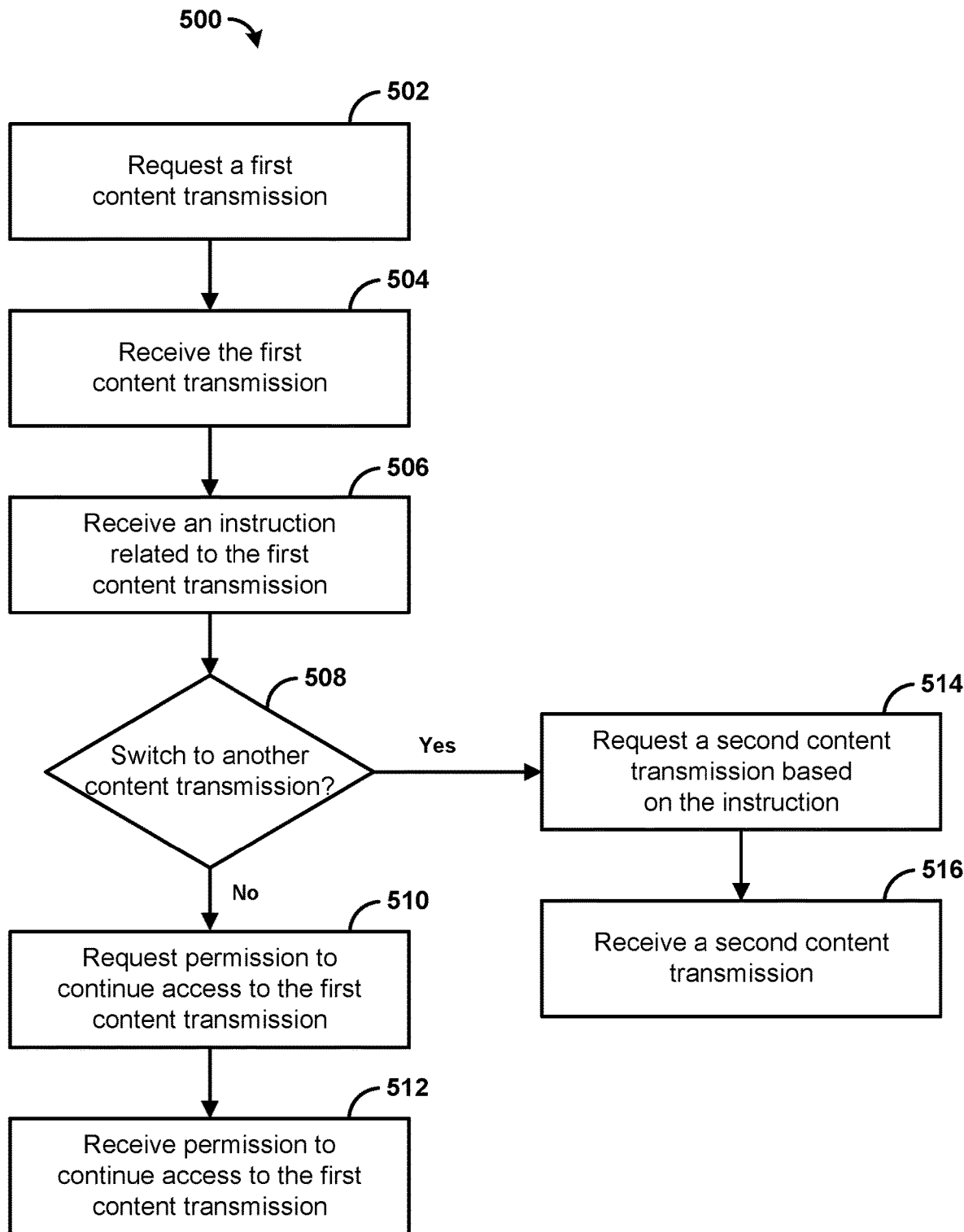
FIG. 5 is a flowchart illustrating another example method for providing content.

FIG. 5 is a flowchart illustrating another example method 500 for providing content. At step 502, a first content transmission (e.g., first multicast content transmission) can be requested. For example, the request can be a request by a user and/or a device, such as an edge device, user device, and/or the like. The first content transmission can comprise a content stream, file transfer, and/or the like.

At step 504, the first content transmission can be received. For example, the first content transmission can be a received by a user and/or a device, such as an edge device, user device, and/or the like.

At step 506, an instruction related to the first content transmission can be received. The instruction can comprise an instruction that the first content transmission will cease transmission according to specified timing information. For example, the timing information can comprise a time, date, time stamp, time duration. The timing information can indicate when the first content transmission will cease to be transmitted. The timing information can indicate when a device should cease accessing, requesting, and/or receiving the first content transmission. The timing information can indicate when a device should access another content transmission, such as second content transmission (e.g., second multicast content transmission). The instruction can comprise an instruction to access the second content transmission instead of the first content transmission.

The instruction can be received in response to analysis of a parameter, such as a number of users accessing the first content transmission being above or below a threshold. In one aspect, the parameter can comprise one or more values. In another aspect, the parameter can be used with one or more additional parameters.

The instruction can be received based on a number of users accessing, requesting, and/or receiving the first content transmission crossing a threshold value. The threshold can comprise predefined values. The threshold can also vary based on one or more conditions, such as user input, network conditions, and/or the like. For example, a threshold can be higher or lower based on network congestion, server outages, and/or the like. It can be determined if the parameter is above, below, and/or equal to the predefined number. In one aspect, the parameter can be compared to additional thresholds. For example, the parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

At step 508, a determination can be made based on the instruction. For example it can be determined whether to switch to another content transmission. For example, it can be determined whether to switch to the second content transmission (e.g., second multicast content transmission). In one aspect, the determination can be made based on a characteristic of a device receiving the instruction. The characteristic can comprise at least one of a screen size, a bandwidth, a screen resolution, class of device, device history, a location, and a client account feature (e.g., user preference, subscription tier). The characteristic can comprise a measurement of a buffer of the device accessing the first content transmission. If it is determined to switch to another content transmission, then the method 500 can proceed to step 514. If it is determined not to switch to another content transmission, then the method 500 can proceed to step 510.

At step 510, permission to continue access to the first content transmission can be requested. For example, a device receiving the instruction can request permission to continue access to the first content transmission. The device can request permission based on the characteristic of the device. For example, the request can comprise the characteristic and/or information indicative of the characteristic.

For example, the characteristic can be indicative of at least one of a bandwidth, memory, processing capacity, and/or the like of the device.

At step 512, permission to continue access to the first content transmission can be received. For example, permission can be received from a device providing the first content transmission, an intermediary device, and/or the like. In some implementations, the method 500 can proceed to step 514. For example, the second content transmission can comprise the first content transmission.

At step 514, the second content transmission can be requested based on the instruction. For example, requesting the second content transmission based on the instruction can comprise determining the second content transmission based on a characteristic associated with a device that is receiving the first content transmission. The characteristic can comprise at least one of a screen size, a bandwidth, a screen resolution, class of device, device history, a location, and a client account feature. The characteristic can comprise a measurement of a buffer of the device accessing the first content transmission.

The first content transmission can comprise content at a first bit rate. The second content transmission can comprise the content at a second bit rate. The first bit rate can be different than the second bit rate. For example, the first bit rate can be a bit rate that is lower or higher than the second bit rate. As an illustration, if the characteristic indicates that the device is associated with a bandwidth, memory, processing capacity, and/or the like such that the device is configured to receive a higher bit rate (e.g., or lower bit rate) than the first bit rate, then the second bit rate can comprise a bit rate higher (e.g., or lower bit rate) than the first bit rate.

At step 516, the second content transmission can be received. For example, the second transmission can be received by the device requesting the second content transmission.

Figure 6:
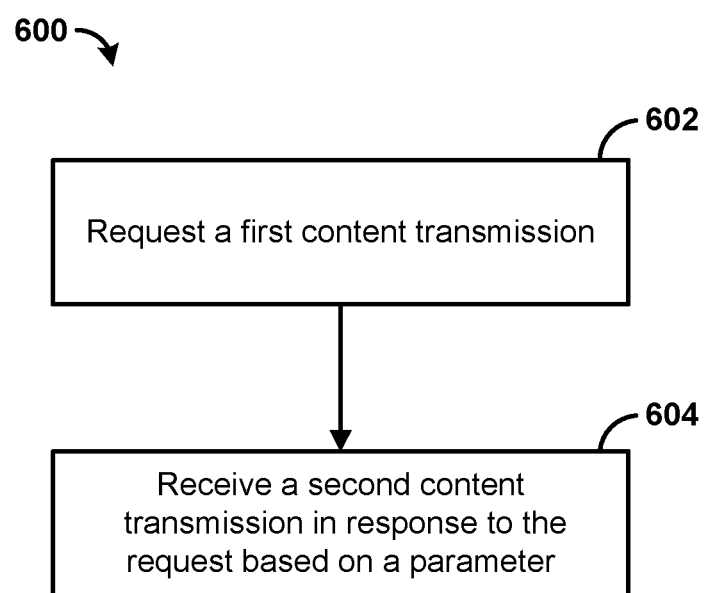
FIG. 6 is a flowchart illustrating another example method for providing content.

FIG. 6 is a flowchart illustrating another example method 600 for providing content. At step 602, a first content transmission (e.g., first multicast content transmission) can be requested. The first content transmission can be requested by a device (e.g., edge device, user device). The first content transmission can comprise a content stream, file transfer, and/or the like.

At step 604, a second content transmission (e.g., second multicast content transmission) can be received. The second content transmission can be received by the device. The second content transmission can comprise a content stream, file transfer, and/or the like. The second content transmission can be received in response to the requesting of the first content transmission.

The second content transmission can be received instead of the first content transmission based on a parameter, such as a number of users accessing the first content transmission. In one aspect, the parameter can comprise one or more values. In another aspect, the parameter can be used with one or more additional parameters. For example, the second content transmission can be received instead of the first content transmission based on the parameter (e.g., number of users accessing the first content transmission) being below, above, and/or equal to a threshold or other analysis of the parameter. The threshold can comprise a predefined value, such as a number. The threshold can also vary based on one or more conditions, such as user input, network conditions, and/or the like. For example, a threshold can be higher or lower based on network congestion, server outages, and/or the like. It can be determined if the parameter is above, below, and/or equal to the predefined number. In one aspect, the parameter can be compared to additional thresholds. For example, the parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

The second content transmission can be identified as the first content transmission when the second content transmission is received in response to the requesting of the first content transmission. For example, the second content transmission can be identified by the same identifier (e.g., network identifier, content identifier, location identifier) as the first content transmission. As another example, the device can be unaware that the second content transmission is being received instead of the first content transmission.

In one aspect, the second content transmission can be received based on a characteristic associated with a device that is requesting the first content transmission. The second content transmission can be selected for and provided to the device. For example, the characteristic can comprise at least one of a screen size, a bandwidth, a screen resolution, class of device, device history, a location, and a client account feature. The characteristic can be based on a measurement of a buffer of at least one device accessing the first content transmission. For example, the measurement of the buffer of the at least one device can be indicative of at least one of a bandwidth, memory, processing capacity, and/or the like of the at least one device.

The first content transmission can comprise content at a first bit rate. The second content transmission can comprise the content at a second bit rate. The first bit rate can be different than the second bit rate. For example, the first bit rate can be a bit rate that is lower or higher than the second bit rate. As an illustration, if the characteristic indicates that the device is associated with a bandwidth, memory, processing capacity, and/or the like such that the device is configured to receive a higher bit rate (e.g., or lower bit rate) than the first bit rate, then the second bit rate can comprise a bit rate higher (e.g., or lower bit rate) than the first bit rate.

Figure 7:
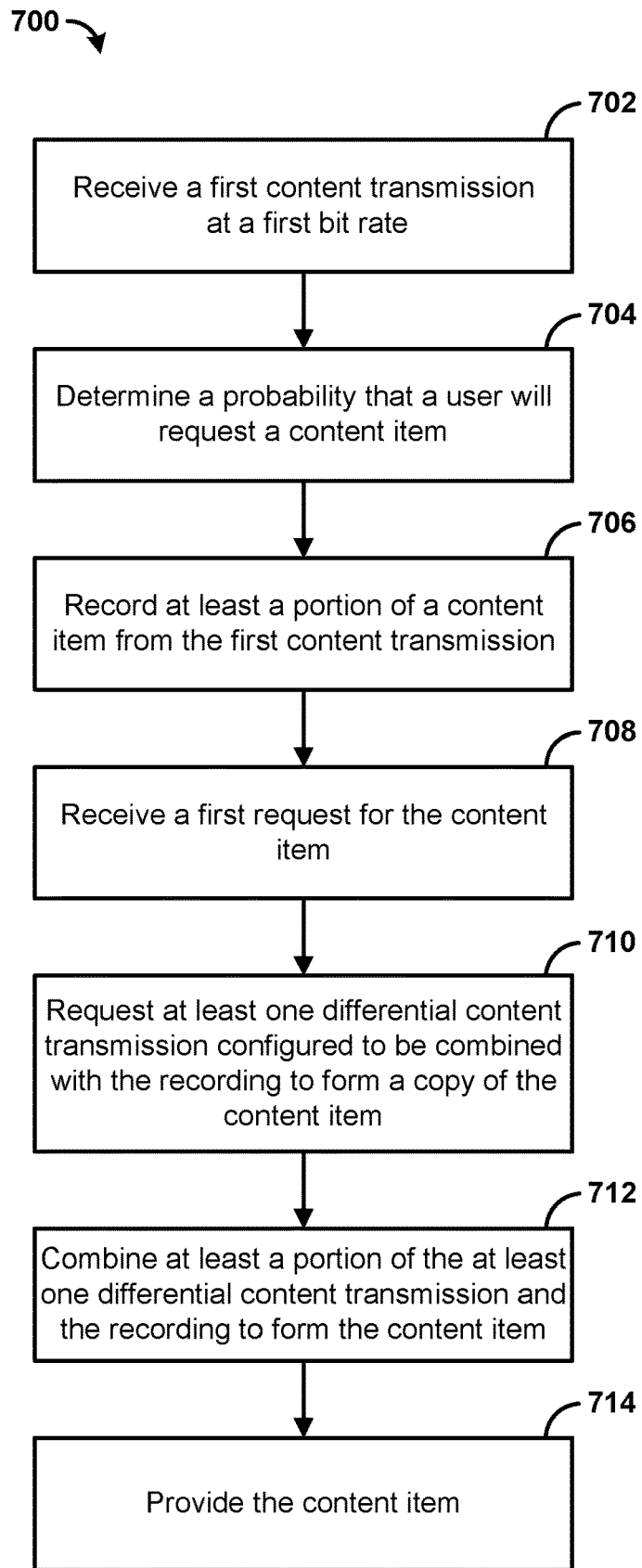
FIG. 7 is a flowchart illustrating another example method for providing content.

FIG. 7 is a flowchart illustrating another example method 700 for providing content. At step 702, a first content transmission (e.g., first multicast content transmission) at a first bit rate can be received. The first content transmission can comprise a content stream, file transfer, and/or the like. For example, the first content transmission can comprise a video on demand content transmission. For example, the first content transmission can comprise a content item, such as a video, movie, show, program, episode, newscast, sportscasts, and/or the like. In one aspect, the first content transmission can comprise a differential content transmission, such as a scalable video coding (SVC) based content transmission.

In one aspect, the first content transmission can be provided and/or received in response to a request (e.g., second request) from a first user at a first device. The first content transmission can be received at the first device, a second device, and/or other devices. For example, the first device can be in the same multicast domain as the second device. The first content transmission can comprise a multicast transmission.

At step 704, a probability that a user (e.g., second user associated with the second device) will request a content item can be determined. The probability can be based on a user history, such as a user viewing history, recording history, and/or the like. The probability can be based on a user preference, social media information, geographic information (e.g., user location), demographics (e.g., gender, ethnicity, age), behavior of a group of users (e.g., social media contacts, address book contacts, users similar in geographic information and/or demographic information), and/or the like.

At step 706, at least a portion of a content item can be recorded from the first content transmission. For example, recording at least the portion of the content item from the first content transmission can comprise recording the at least the portion of the content item in a recording buffer. As another example, recording at least the portion of the content item from the first content transmission can be performed in response to the probability being above a threshold. The threshold can comprise a predefined value, such as a number. The threshold can also vary based on one or more conditions, such as user input, network conditions, and/or the like. For example, a threshold can be higher or lower based on network congestion, server outages, and/or the like.

At step 708, a first request for the content item can be received. The first request for the content item can be received after the recording of at least the portion of the content item. The first request for the content item can be from the second user at the second device.

At step 710, at least one differential content transmission can be requested. For example, the second device can request the at least one differential content transmission in response to receiving the request for the content item. The at least one differential content transmission can comprise a scalable video coding (SVC) based content stream. The at least one differential content transmission can be configured to be combined with the recording of the at least a portion of the content item to form a copy of the content item at a second bit rate. The request for at least one differential content transmission can comprise a request for a first differential content transmission. In one aspect, a second differential content transmission can be received instead of the first differential content transmission. The second differential content transmission can be received instead of the first differential content transmission based on a parameter, such as a number of users at least one of accessing, requesting, and/or receiving the first differential content transmission. The second differential content transmission can be received based on a characteristic associated with a device (e.g., second device) requesting the first differential content transmission. The second differential content transmission can be selected for and provided to the device (e.g., second device). The characteristic can comprise at least one of a screen size, a bandwidth, a screen resolution, class of device, device history, a location, a client account feature, and/or the like. The characteristic can be based on a measurement of a buffer of at least one device (e.g., first device, second device) accessing the first content transmission.

In aspect, the second bit rate can be higher than the first bit rate. For example, the first bit rate can be a bit rate that is lower or higher than the second bit rate. As an illustration, if the characteristic indicates that the device (e.g., second device) is associated with a bandwidth, memory, processing capacity, and/or the like such that the device (e.g., second devices) is configured to receive a higher bit rate (e.g., or lower bit rate) than the first bit rate, then the second bit rate can comprise a bit rate higher (e.g., or lower bit rate) than the first bit rate.

At step 712, at least a portion of the at least one differential content transmission can be combined (e.g., at the second device) with the recording to form the content item. For example, the at least on differential content transmission can be configured to be combined with other differential content transmissions (e.g., of the at least one differential content transmission, or otherwise) to form the complete content item, and/or transmission thereof. At step 714, the content item can be provided. For example, the content can be provided (e.g., by the second device) to a display device (e.g., television, screen, display) or other device (e.g., via a network or bus) for consumption by a user.

Figure 8:
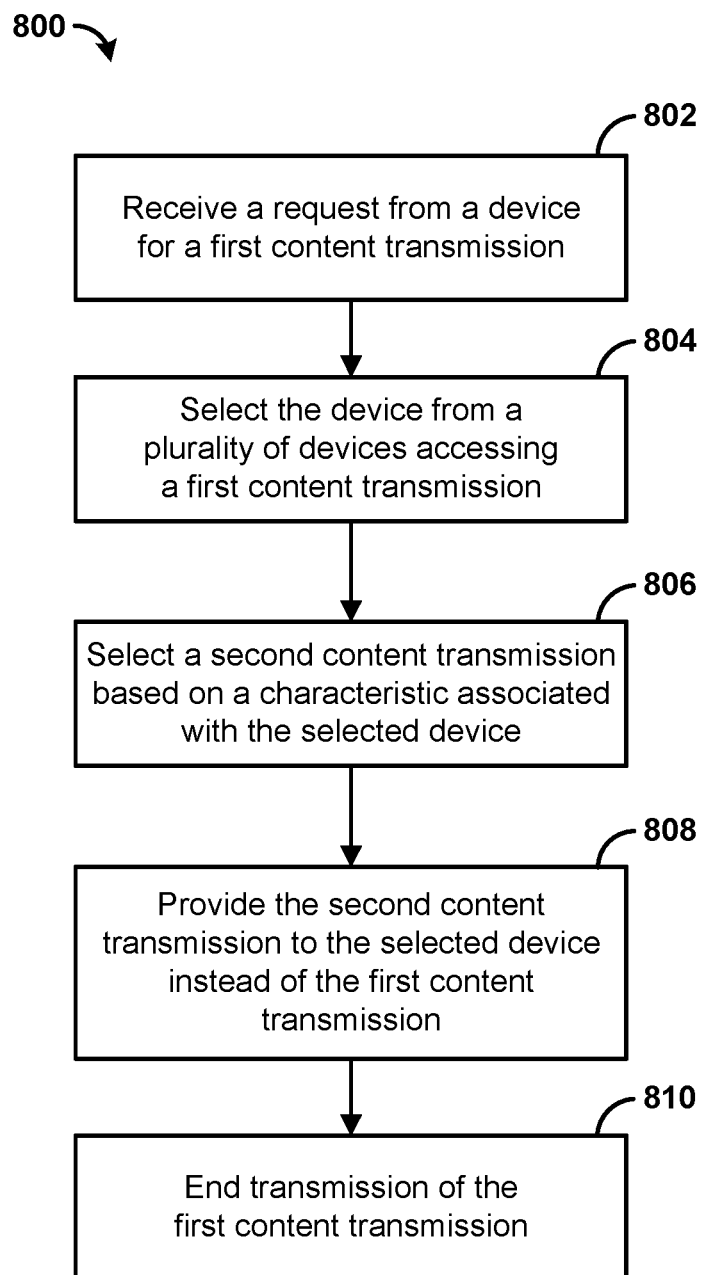
FIG. 8 is a flowchart illustrating another example method for providing content.

FIG. 8 is a flowchart illustrating another example method 800 for providing content. At step 802, a request for a first content transmission (e.g., first multicast content transmission) can be received from a device. The first content transmission can be provided to the device in response to the request. The first content transmission can comprise a content stream, file transfer, and/or the like.

At step 804, the device can be selected from a plurality of devices accessing, requesting, and/or receiving the first content transmission. For example, the device can be selected in response to a parameter, such as a number of users accessing the first content transmission reaching a threshold value. It can be determined if the parameter is above, below, and/or equal to the threshold. The threshold can comprise a predefined value, such as a number. The threshold can also vary based on one or more conditions, such as user input, network conditions, and/or the like. For example, a threshold can be higher or lower based on network congestion, server outages, and/or the like. For example, a threshold can be higher or lower based on network congestion, server outages, and/or the like. In one aspect, the parameter can be compared to additional thresholds. For example, the parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

The device can be selected based on a measurement of a buffer of the device. For example, the measurement of the buffer of the device can be indicative of at least one of a bandwidth, memory, processing capacity, and/or the like of the device. In one aspect, the device can be selected based on a characteristic associated with the device. The characteristic can comprise at least one of a screen size, a bandwidth, a screen resolution, class of device, device history, a location, a buffer availability, a client account feature, and/or the like.

At step 806, a second content transmission (e.g., second multicast content transmission) can be selected based on a characteristic associated with the selected device. The characteristic can comprise at least one of a screen size, a bandwidth, a screen resolution, class of device, device history, a location, and a client account feature. The second content transmission can be selected based on a measurement of a buffer of the device.

At step 808, the second content transmission can be provided to the selected device instead of the first content transmission. The second content transmission can be identified as the first content transmission when the second content transmission is provided to the selected device. For example, the second content transmission can be identified by the same identifier (e.g., network identifier, content identifier, location identifier) as the first content transmission. The second content transmission can be provided in response to the request.

The first content transmission can comprise content at a first bit rate. The second content transmission can comprise the content at a second bit rate. The first bit rate can be different than the second bit rate. For example, the first bit rate can be a bit rate that is lower or higher than the second bit rate. As an illustration, if the characteristic indicates that the device is associated with a bandwidth, memory, processing capacity, and/or the like such that the device is configured to receive a higher bit rate (e.g., or lower bit rate) than the first bit rate, then the second bit rate can comprise a bit rate higher (e.g., or lower bit rate) than the first bit rate.

At step 810, transmission of the first content transmission can be ended. For example, a device providing the first content transmission can discontinue providing the first content transmission across a network. For example, the transmission of the first content transmission can be ended for one or more first downstream transmission groups. In some scenarios, one or more second downstream transmission groups can continue to receive the first content transmission.

Figure 9:
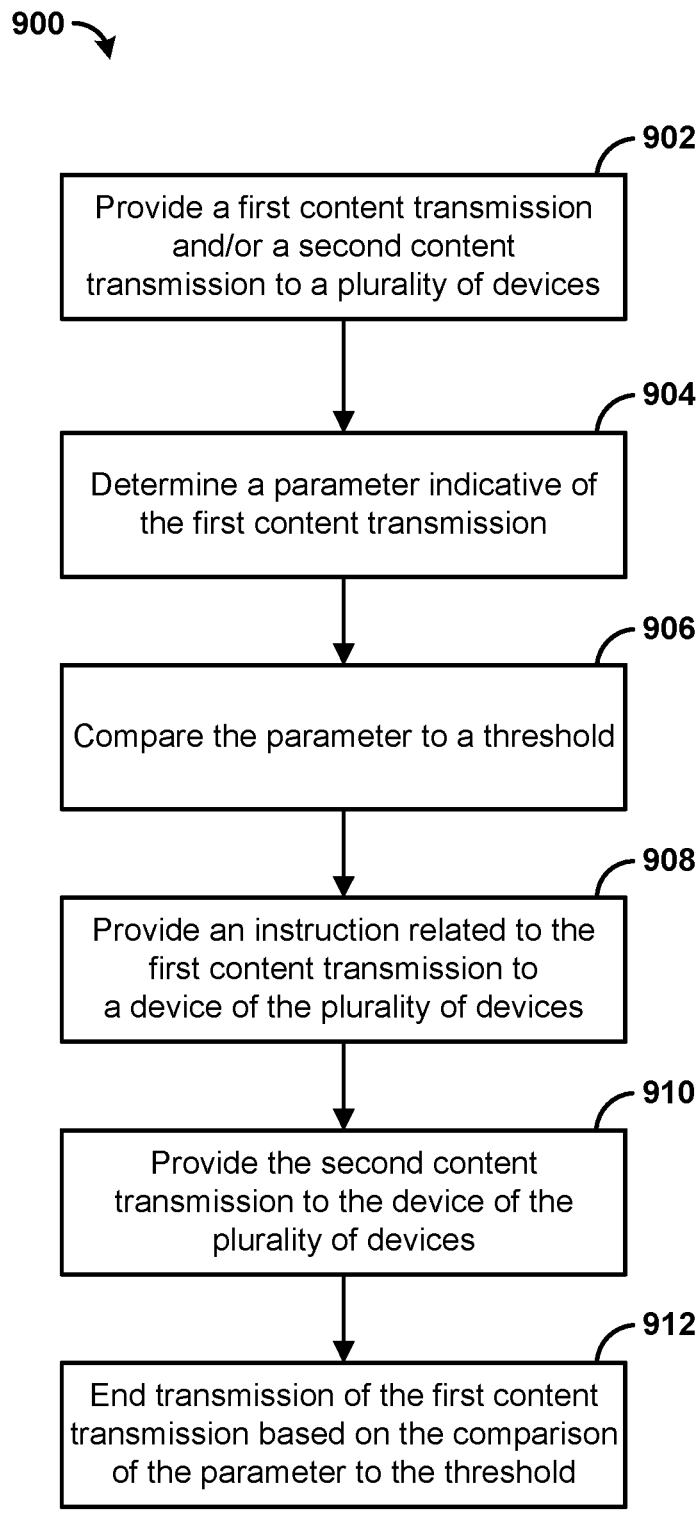
FIG. 9 is a flowchart illustrating another example method for providing content.

FIG. 9 is a flowchart illustrating another example method 900 for providing content. At step 902, a first content transmission (e.g., first multicast content transmission) and/or a second content transmission (e.g., second multicast content transmission) can be provided to a plurality of devices. For example, the first content transmission can be provided a first portion of the plurality of devices, and the second content transmission can be provided to a second portion of the plurality of devices. As another example, both the first content transmission and the second transmission can be provided to the plurality of devices (e.g., at the same time, at different times). The first content transmission can comprise content at a first bit rate. The second content transmission can comprise the content at a second bit rate. The first bit rate can be different than the second bit rate. The first content transmission can comprise a content stream, file transfer, and/or the like. The second content transmission can comprise a content stream, file transfer, and/or the like.

At step 904, a parameter indicative of the first content transmission can be determined. For example, the parameter can comprise a number of the plurality of devices accessing, requesting, and/or receiving the first content transmission. In one aspect, the parameter can comprise one or more values. In another aspect, the parameter can be determined with one or more additional parameters.

At step 906, the parameter (e.g., number of the plurality of devices accessing, requesting, and/or receiving the first content transmission) can be compared to a threshold or otherwise analyzed. The threshold can comprise predefined values. The threshold can also vary based on one or more conditions, such as user input, network conditions, and/or the like. For example, a threshold can be higher or lower based on network congestion, server outages, and/or the like. It can be determined if the parameter is above, below, and/or equal to the predefined number. In one aspect, the parameter can be compared to additional thresholds. For example, the parameter can have multiple values (e.g., number, type), and one or more of these values can be compared to one or more thresholds. As a further example, multiple parameters can be compared to one or more thresholds. A person of ordinary skill in the art can determine the values of the thresholds based on design conditions, network policies, user information, and/or the like.

At step 908, an instruction related to the first content transmission can be provided to a device of the plurality of devices. The instruction can comprise an instruction that the first content transmission will cease transmission according to specified timing information. For example, the timing information can comprise a time, date, time stamp, time duration. The timing information can indicate when the first content transmission will cease to be transmitted. The timing information can indicate when a device should cease accessing, requesting, and/or receiving the first content transmission. The timing information can indicate when a device should access another content transmission, such as a multicast content transmission. The instruction can comprise an instruction to access a second content transmission instead of the first content transmission. The instruction can be provided in response to the number of the plurality of devices accessing the first content transmission being below a threshold.

At step 910, a second content transmission (e.g., second multicast content transmission) can be provided to the device of the plurality of devices. For example, the second content transmission can be provided to the device if second content transmission was not already being provided to the device. The second content transmission can be selected for the device based on a characteristic associated with the device. The characteristic can comprise at least one of a screen size, a bandwidth, a screen resolution, class of device, device history, a location, and a client account feature. As an illustration, the first content transmission can comprise content at a first bit rate. The second content transmission can comprise the content at a second bit rate. The first bit rate can be different than the second bit rate. The first bit rate can be a bit rate that is lower or higher than the second bit rate. If the characteristic indicates that the device is associated with a bandwidth, memory, processing capacity, and/or the like such that the device is configured to receive a higher bit rate (e.g., or lower bit rate) than the first bit rate, then the second bit rate can comprise a bit rate higher (e.g., or lower bit rate) than the first bit rate.

At step 912, transmission of the first content transmission can be ended based on the comparison of the parameter (e.g., number of the plurality of devices accessing, requesting, and/or receiving the first content transmission) to the threshold or other analysis. For example, the transmission of the first content transmission can be ended for one or more first downstream transmission groups. In some scenarios, one or more second downstream transmission groups can continue to receive the first content transmission.

Figure 10:
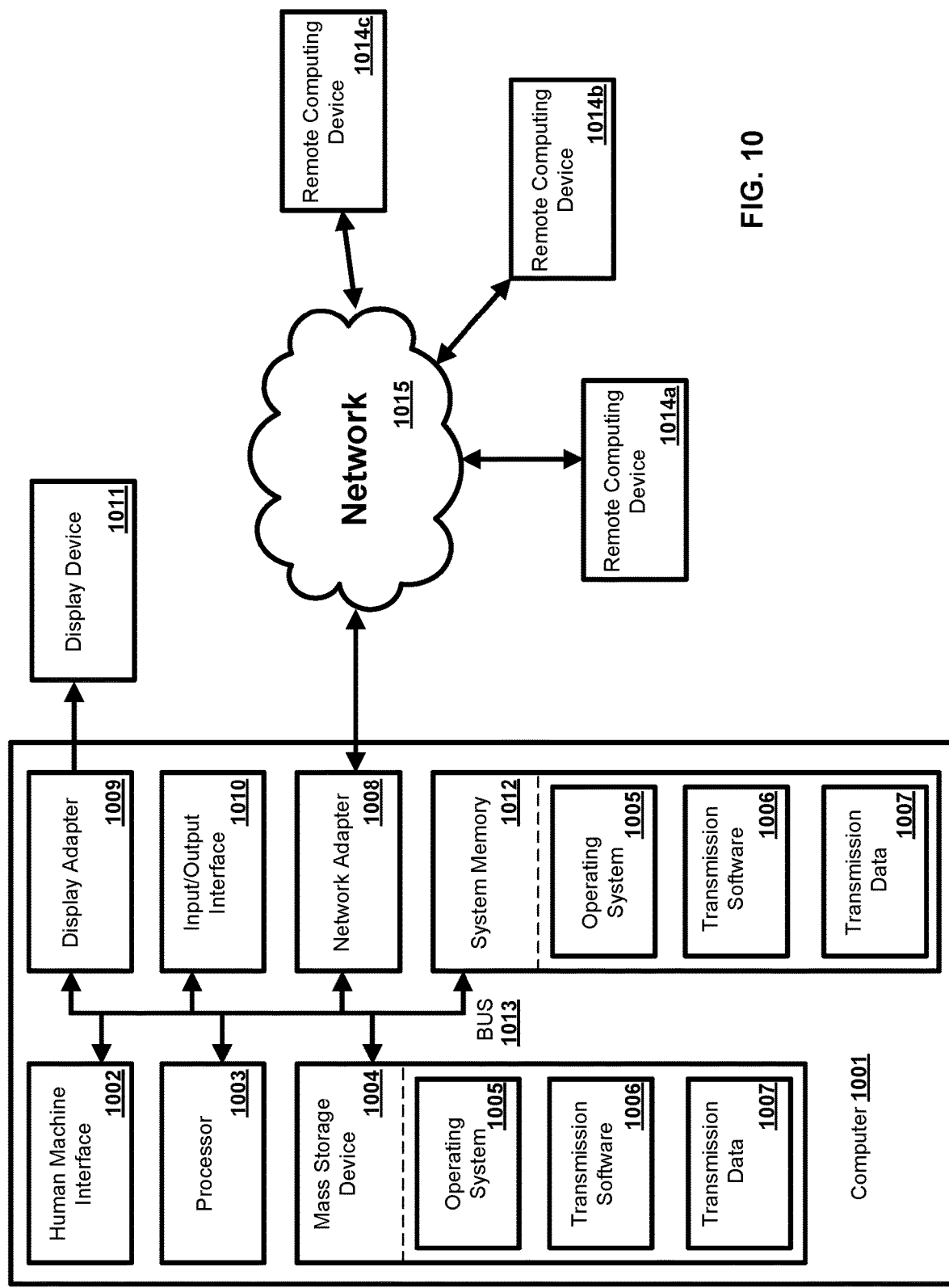
FIG. 10 is a block diagram illustrating an example computing device which can be used to implement various methods and system disclosed herein.

In an exemplary aspect, the methods and systems can be implemented on a computer 1001 as illustrated in FIG. 10 and described below. By way of example, the content device 102 of FIG. 1 can be a computer as illustrated in FIG. 10. As another example, the first device 202, second device 214, and/or third device 220 of FIG. 2 can be a computer as illustrated in FIG. 10. Similarly, the methods and systems disclosed can utilize one or more computers to perform one or more functions in one or more locations. FIG. 10 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 1001. The components of the computer 1001 can comprise, but are not limited to, one or more processors 1003, a system memory 1012, and a system bus 1013 that couples various system components including the one or more processors 1003 to the system memory 1012. In one aspect, the system can utilize parallel computing.

The system bus 1013 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The system bus 1013, and all buses specified in this description can also be implemented over a wired or wireless network connection and each of the subsystems, including the one or more processors 1003, a mass storage device 1004, an operating system 1005, transmission software 1006, transmission data 1007, a network adapter 1008, system memory 1012, an Input/Output Interface 1010, a display adapter 1009, a display device 1011, and a human machine interface 1002, can be contained within one or more remote computing devices 1014a,b,c at physically separate locations, connected through buses of this form, in effect implementing a fully distributed system.

The computer 1001 typically comprises a variety of computer readable media. Exemplary readable media can be any available media that is accessible by the computer 1001 and comprises, for example and not meant to be limiting, both volatile and non-volatile media, removable and non-removable media. The system memory 1012 comprises computer readable media in the form of volatile memory, such as random access memory (RAM), and/or non-volatile memory, such as read only memory (ROM). The system memory 1012 typically contains data such as transmission data 1007 and/or program modules such as operating system 1005 and transmission software 1006 that are immediately accessible to and/or are presently operated on by the one or more processors 1003.

In another aspect, the computer 1001 can also comprise other removable/non-removable, volatile/non-volatile computer storage media. By way of example, FIG. 10 illustrates a mass storage device 1004 which can provide non-volatile storage of computer code, computer readable instructions, data structures, program modules, and other data for the computer 1001. For example and not meant to be limiting, a mass storage device 1004 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 1004, including by way of example, an operating system 1005 and transmission software 1006. Each of the operating system 1005 and transmission software 1006 (or some combination thereof) can comprise elements of the programming and the transmission software 1006. Transmission data 1007 can also be stored on the mass storage device 1004. Transmission data 1007 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 1001 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 1003 via a human machine interface 1002 that is coupled to the system bus 1013, but can be connected by other interface and bus structures, such as a parallel port, game port, an IEEE 1394 Port (also known as a Firewire port), a serial port, or a universal serial bus (USB).

In yet another aspect, a display device 1011 can also be connected to the system bus 1013 via an interface, such as a display adapter 1009. It is contemplated that the computer 1001 can have more than one display adapter 1009 and the computer 1001 can have more than one display device 1011. For example, a display device can be a monitor, an LCD (Liquid Crystal Display), or a projector. In addition to the display device 1011, other output peripheral devices can comprise components such as speakers (not shown) and a printer (not shown) which can be connected to the computer 1001 via Input/Output Interface 1010. Any step and/or result of the methods can be output in any form to an output device. Such output can be any form of visual representation, including, but not limited to, textual, graphical, animation, audio, tactile, and the like. The display device 1011 and computer 1001 can be part of one device, or separate devices.

The computer 1001 can operate in a networked environment using logical connections to one or more remote computing devices 1014a,b,c. By way of example, a remote computing device can be a personal computer, portable computer, smartphone, a server, a router, a network computer, a peer device or other common network node, and so on. Logical connections between the computer 1001 and a remote computing device 1014a,b,c can be made via a network 1015, such as a local area network (LAN) and/or a general wide area network (WAN). Such network connections can be through a network adapter 1008. A network adapter 1008 can be implemented in both wired and wireless environments. Such networking environments are conventional and commonplace in dwellings, offices, enterprise-wide computer networks, intranets, and the Internet.

For purposes of illustration, application programs and other executable program components such as the operating system 1005 are illustrated herein as discrete blocks, although it is recognized that such programs and components reside at various times in different storage components of the computer 1001, and are executed by the data processor(s) of the computer. An implementation of transmission software 1006 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

The invention claimed is:

1. One or more non-transitory computer-readable media storing processor-executable instructions that, when executed by at least one processor, cause the at least one processor to:
   determine a first user device of a plurality of user devices in a first multicast content transmission group accessing a first multicast content transmission at a first bit rate;
   determine a second multicast content transmission group accessing a second multicast content transmission at a second bit rate, wherein the first bit rate is different from the second bit rate; and
   switch the first user device from the first multicast content transmission group to the second multicast content transmission group, wherein in the second multicast content transmission group the first user device accesses the second multicast content transmission at the second bit rate.

2. The one or more non-transitory computer-readable media of claim 1, wherein the processor-executable instructions that, when executed by the at least one processor, cause the at least one processor to determine the first user device of the plurality of user devices in the first multicast content transmission group, cause the at least one processor to determine the first user device of the plurality of user devices based on a characteristic associated with the first user device.

3. The one or more non-transitory computer-readable media of claim 2, wherein the characteristic comprises at least one of a screen size of the first user device, a bandwidth, a location, a client account feature, or a screen resolution of the first user device.

4. The one or more non-transitory computer-readable media of claim 1, wherein the first multicast content transmission comprises content at the first bit rate, and wherein the second multicast content transmission comprises the content at the second bit rate.

5. The one or more non-transitory computer-readable media of claim 1, wherein the processor-executable instructions, when executed by the at least one processor, further cause the at least one processor to determine a quantity of user devices accessing the first multicast content transmission, wherein the processor-executable instructions that, when executed by the at least one processor, cause the at least one processor to switch the first user device from the first multicast content transmission group to the second multicast content transmission group, cause the at least one processor to switch the first user device from the first multicast content transmission group to the second multicast content transmission group based at least on the quantity of user devices accessing the first multicast content transmission.

6. One or more non-transitory computer-readable media storing processor-executable instructions that, when executed by at least one processor, cause the at least one processor to:
   determine a first user device of a plurality of user devices in a first multicast content transmission group accessing a first multicast content transmission having a first bit rate;
   determine a second multicast content transmission group accessing a second multicast content transmission having a second bit rate; and send, to the first user device of the plurality of user devices, an instruction, wherein the instruction causes the first user device to migrate from the first multicast content transmission group to the second multicast content transmission group.

7. The one or more non-transitory computer-readable media of claim 6, wherein the processor-executable instructions that, when executed by the at least one processor, cause the at least one processor to determine the first user device of the plurality of user devices in the first multicast content transmission group, cause the at least one processor to determine the first user device of the plurality of user devices based on a characteristic associated with the first user device.

8. The one or more non-transitory computer-readable media of claim 7, wherein the characteristic comprises at least one of a screen size of the first user device, a bandwidth, a location of the first user device, a client account feature, or a screen resolution of the first user device.

9. The one or more non-transitory computer-readable media of claim 8, wherein the client account feature comprises one or more of a subscription tier or a user preference.

10. The one or more non-transitory computer-readable media of claim 6, wherein the processor-executable instructions, when executed by the at least one processor, further cause the at least one processor to receive, from the first user device, a request for the first multicast content transmission at the first bit rate and wherein the processor-executable instructions that, when executed by the at least one processor, cause the at least one processor to send, to the first user device of the plurality of user devices, the instruction, cause the at least one processor to send the instruction based on receiving the request for the first multicast content transmission from the first user device.

11. The one or more non-transitory computer-readable media of claim 6, wherein the first multicast content transmission comprises content at the first bit rate, and wherein the second multicast content transmission comprises the content at the second bit rate.

12. A system comprising:
a computing device configured to:
determine a first user device of a plurality of user devices in a first multicast content transmission group accessing a first multicast content transmission at a first bit rate;
determine a second multicast content transmission group accessing a second multicast content transmission at a second bit rate, wherein the first bit rate is different from the second bit rate; and
switch the first user device from the first multicast content transmission group to the second multicast content transmission group, wherein in the second multicast content transmission group the first user device accesses the second multicast content transmission at the second bit rate; and
the first user device configured to:
access the first multicast content transmission; and
access the second multicast content transmission.

13. The system of claim 12, wherein to determine the first user device of the plurality of user devices in the first multicast content transmission group, the computing device is configured to determine the first user device of the plurality of user devices based on a characteristic associated with the first user device.

14. The system of claim 13, wherein the characteristic comprises at least one of a screen size of the first user device, a bandwidth, a location, a client account feature, or a screen resolution of the first user device.

15. The system of claim 12, wherein the first multicast content transmission comprises content at the first bit rate, and wherein the second multicast content transmission comprises the content at the second bit rate.

16. The system of claim 12, wherein the computing device is further configured to determine a quantity of user devices accessing the first multicast content transmission, wherein to switch the first user device from the first multicast content transmission group to the second multicast content transmission group, the computing device is configured to switch the first user device from the first multicast content transmission group to the second multicast content transmission group based at least on the quantity of user devices accessing the first multicast content transmission.

17. A system comprising:
a computing device configured to:
determine a first user device of a plurality of user devices in a first multicast content transmission group accessing a first multicast content transmission having a first bit rate;
determine a second multicast content transmission group accessing a second multicast content transmission having a second bit rate; and
send, to the first user device of the plurality of user devices, an instruction, wherein the instruction causes the first user device to migrate from the first multicast content transmission group to the second multicast content transmission group; and
the first user device configured to:
receive the instruction; and
migrate from the first multicast content transmission group to the second multicast content transmission group.

18. The system of claim 17, wherein to determine the first user device of the plurality of user devices in the first multicast content transmission group, the computing device is configured to determine the first user device of the plurality of user devices based on a characteristic associated with the first user device.

19. The system of claim 18, wherein the characteristic comprises at least one of a screen size of the first user device, a bandwidth, a location of the first user device, a client account feature, or a screen resolution of the first user device.

20. The system of claim 19, wherein the client account feature comprises one or more of a subscription tier or a user preference.

21. The system of claim 17, wherein the computing device is further configured to receive, from the first user device, a request for the first multicast content transmission at the first bit rate and wherein to send, to the first user device of the plurality of user devices, the instruction, the computing device is configured to send the instruction based on receiving the request for the first multicast content transmission from the first user device.

22. The system of claim 17, wherein the first multicast content transmission comprises content at the first bit rate, and wherein the second multicast content transmission comprises the content at the second bit rate.

* * * * *